Aug. 19, 1930.  L. F. CURTIS  1,773,573
VARIABLE CONDENSER
Filed Sept. 1, 1927
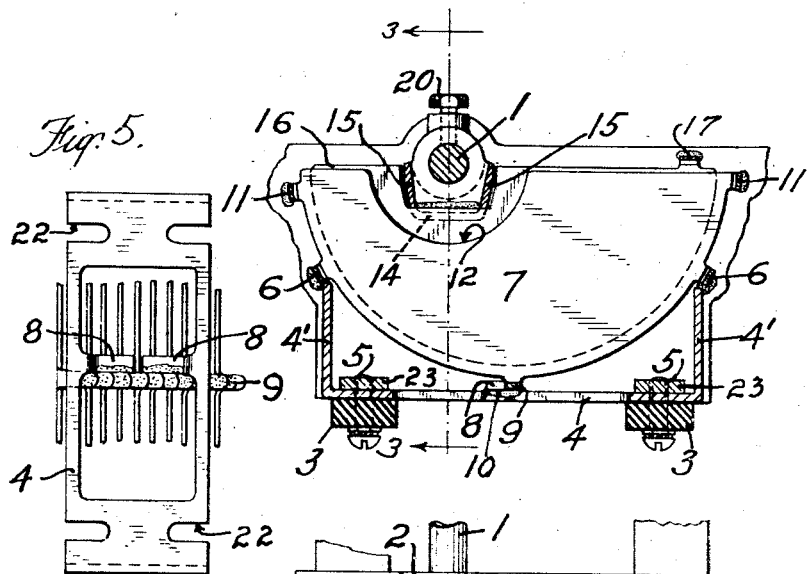
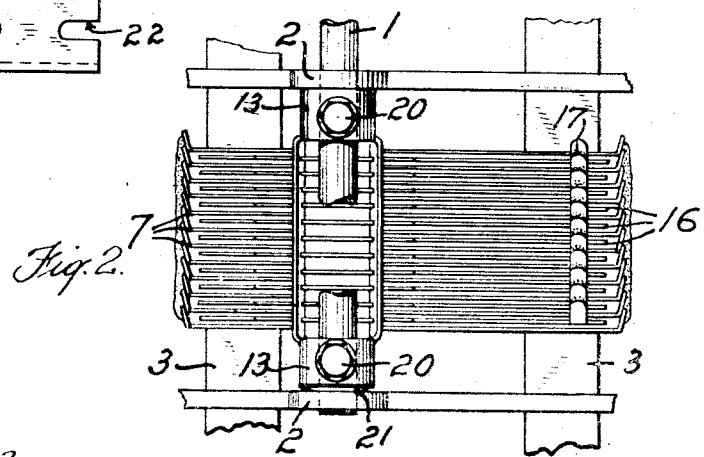
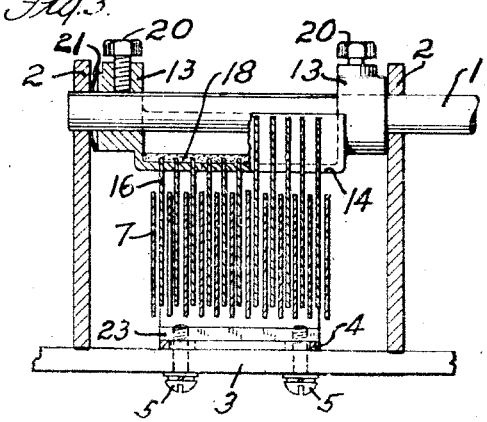
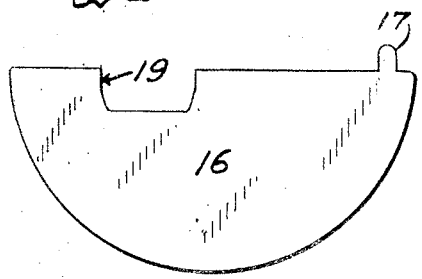
INVENTOR
Leslie F. Curtis
BY
ATTORNEY Patented Aug. 19, 1930

1,773,573

UNITED STATES PATENT OFFICE

LESLIE F. CURTIS, OF SPRINGFIELD, MASSACHUSETTS, ASSIGNOR TO AMERICAN BOSCH MAGNETO CORPORATION, OF SPRINGFIELD, MASSACHUSETTS, A CORPORATION OF NEW YORK

VARIABLE CONDENSER

Application filed September 1, 1927. Serial No. 216,811.

The present invention relates to variable condensers for radio and other purposes in which a series of axially spaced rotor plates is adapted to be interleaved more or less with a series of axially spaced stator plates for varying the capacity of an electric circuit, and particularly to a condenser of this kind having its stator and rotor plates held rigidly against deformation and shift and of such form as to save metal and give a comparatively low minimum capacity.

Heretofore, in condensers in which the rotor plates were soldered to the hub, it was customary to have extensions of the plates fully or nearly embracing the hub and to solder the extensions around the outside of the hub in shallow cuts therein, with the result that mechanical rigidity at the hub was not reliably maintained, and, besides decreasing the number of plates that could be blanked out of a given area of metal, the extensions came between the stator plates at the end of the rotating movement of the rotor and thereby increased the minimum capacity of the condenser. Furthermore, the soldering and the inspection were both difficult and the plates often came loose in service.

In accordance with my invention, the rotor has a hub with through slots, the plates passing through the slots and being fastened inside the hub. Preferably the hub has end portions of closed section through which a rotatable shaft passes in tight connection therewith, and has an intermediate portion of trough form with the slots through its base. The plates may have cut out portions at their center of rotation and where the hub has a trough portion the cut out portion of the plates is preferably of trough form also, with lesser depth and greater width so as to extend outside the trough of the hub and through the slots therein. To further strengthen the rotor structure, the plates may have tabs of well known form at their diametrical edge at one or more places, which tabs are bent over and soldered together to rigidly hold the plates in spaced relation there also.

Furthermore, in accordance with my invention, the stator plates are rigidly held in spaced relation by a cradle fastened to the plates at three places so as to form a double truss reenforcement therefor, the plates preferably having along their semi-circular periphery bent over tabs soldered together and to the cradle. In the preferred embodiment, the cradle has a skeletonized base for inspection from below, and also elongated slots for axial and angular adjustment of the stator on its base with relation to the rotor.

In the accompanying drawings illustrating the preferred form of my invention in application, as an example, to one condenser of a gang in which the rotor plates are of substantially semi-circular form with the center of rotation off their goemetric center.

Fig. 1 is a sectional end elevation showing one condenser; Fig. 2 is a top view thereof without the solder in the trough; Fig. 3 is a section, partly in elevation, on line 3—3 of Fig. 1; Fig. 4 shows a single unassembled rotor plate with the tab still outstanding; and Fig. 5 is a bottom plan view of a stator unit.

A shaft 1 rotatable by any suitable means (not shown) is supported in bearing pedestals 2, of desired located and member, forming with the insulating base members 3 a frame for a gang of condensers with shields between them. The bent metal plate or cradle, having a base 4 and upright end portions 4', is fastened at 5 to the base members 3 and is soldered underneath the bent over and soldered tabs 6 of the spaced stator plates 7. The base 4 is skeletonized as shown in Fig. 5 and has projections 8 against which the bent over and soldered tabs 9 of the stator plates are rigidly held by soldering at 10. The bent over and soldered tabs 11 near the diametrical edge of those plates produce with the other fastening means a rigid stator structure capable of withstanding shock and vibration to an extraordinary degree without deformation of the plates or shift in their spacing. The stator plates have a clearance portion at 12.

The rotor hub has end portions 13 of closed section, and an intermediate portion of trough form, having a base 14 and sides 15, which is cast, pressed or forged integrally with the end portions, or, if desired, fastened to suitable end portions of screw machine manufacture. A series of slots, one for each plate, is cut at proper spacing through the base 14, and the plates 16, tied together by turned over and soldered tabs 17, are inserted therein and the plates are fastened to each other and to the hub by the solder 18 flowed around their ends on the inside of the trough. As shown particularly in Figs. 1 and 4, the cut out portion at 19 of the rotor plates is also of trough form, of lesser depth and greater width than the trough of the hub, with the diametrical edge at or below the axis or rotation. By securing the plates so near their center of gravity and along their diametrical edge in this way, the rotor structure is readily capable of withstanding shock and vibration to an extraordinary degree without distortion of the plates or shift in their spacing.

The rotor structure is mounted in proper position on the shaft 1 which passes through the bore of the end portions 13 and is secured thereto by the screws 20, the spring washer 21 resiliently holding the rotor structure in axial position. The stator structure is fixed in adjusted axial and angular position by means of the screws 5 passing through the elongated slots 22 of the base 4 into the metal plates 23. Upon rotation of the rotor in counter-clockwise direction in Fig. 1, the plates come out of their completely interleaved relation with the stator plates 7 and finally, in a position of 180° from that shown, no part of any rotor plate is opposite any part of any stator plate, whereby the minimum capacity of the condenser is comparatively low.

Having thus described my invention, what I claim is:

1. In a variable condenser, the combination with a rotor, of a stator comprising spaced plates of substantially semi-circular form, and a cradle being a skeletonized base with upright end portions, said base and end portions being fastened to the plates to hold them rigidly spaced.

2. In variable condenser, the combination with a rotor, of a stator comprising a series of substantially semi-circular plates having along their periphery bent over tabs, and a metal cradle soldered to the tabs to hold the plates rigidly spaced, said cradle and stator plates being unitary and mounted independently of the rotor mounting.

3. In a variable condenser, the combination with a rotor, of a stator comprising a series of substantially semi-circular plates having along their periphery bent over and soldered tabs near the ends of their diameter and also bent over tabs intermediate the other tabs, and a metal cradle soldered to those intermediate tabs.

4. In a variable condenser, the combination with a rotor, of a stator comprising spaced plates, and a rigid cradle fastened to said plates, said cradle having a skeletonized base and elongated fastening slots, and means operating in said slots for holding the stator in adjusted position.

5. In a variable condenser, the combination with a rotor, of a stator comprising a series of plates, and a cradle fastened to the plates to hold the plates rigidly spaced, said cradle having along its base a series of elongated slots, and means operating in said slots for holding the stator in adjusted position.

6. A rotor unit comprising a trough portion having transverse slots, and plates having each a substantially unobstructed straight edge clear across a side thereof with a recess at the axis of rotation, the lower edge of said recess intruding into said trough through said slot and the sides of said recess being spaced from said trough.

In testimony whereof I affix my signature.

LESLIE F. CURTIS.